(12) United States Patent
D'Haene et al.

(10) Patent No.: US 7,276,849 B2
(45) Date of Patent: Oct. 2, 2007

(54) PLASMA DISPLAY PANEL FILTERS

(75) Inventors: Pol D'Haene, Kessel-Lo (BE); Paul Daniel Garrett, Sturbridge, MA (US)

(73) Assignee: Solutia Incorporated, St. Louis, MO (US)

(*) Notice: Subject to any disclaimer, the term of this patent is extended or adjusted under 35 U.S.C. 154(b) by 0 days.

(21) Appl. No.: 11/366,104

(22) Filed: Mar. 2, 2006

(65) Prior Publication Data
US 2006/0159903 A1 Jul. 20, 2006

Related U.S. Application Data

(63) Continuation of application No. 10/446,148, filed on May 28, 2003, now abandoned.

(51) Int. Cl.
*H01J 17/49* (2006.01)
*H01J 61/40* (2006.01)
*H01J 5/16* (2006.01)

(52) U.S. Cl. .................. 313/582; 313/587; 313/110; 313/112

(58) Field of Classification Search ......... 313/582–587
See application file for complete search history.

(56) References Cited

U.S. PATENT DOCUMENTS

| | | | |
|---|---|---|---|
| 4,952,457 A | 8/1990 | Cartier | |
| 5,061,568 A | 10/1991 | Kessel | |
| 5,466,755 A | 11/1995 | Sakagami et al. | |
| 5,804,102 A | 9/1998 | Oi et al. | |
| 5,811,923 A | 9/1998 | Zieba et al. | |
| 5,830,568 A | 11/1998 | Kondo | |
| 5,945,209 A | 8/1999 | Okazaki et al. | |
| 6,067,188 A | 5/2000 | Zieba et al. | |
| 6,084,705 A | 7/2000 | Zieba et al. | |
| 6,104,530 A | 8/2000 | Okamura et al. | |
| 6,255,031 B1 | 7/2001 | Yao et al. | |
| 6,262,364 B1* | 7/2001 | Yoshikawa et al. | 174/389 |
| 6,323,340 B1 | 11/2001 | Masuda et al. | |
| 6,333,592 B1 | 12/2001 | Sasa | |
| 6,391,462 B1 | 5/2002 | Jang | |
| 6,469,685 B1 | 10/2002 | Woodruff et al. | |
| 6,522,463 B1 | 2/2003 | Shimomura et al. | |
| 6,680,009 B2 | 1/2004 | Harada et al. | |
| 6,859,310 B2* | 2/2005 | Simpson et al. | 359/359 |
| 2002/0005509 A1 | 1/2002 | Teng | |
| 2002/0018890 A1 | 2/2002 | Sugimachi | |
| 2002/0140339 A1 | 10/2002 | Lee et al. | |
| 2003/0054160 A1 | 3/2003 | Fisher et al. | |
| 2003/0128172 A1* | 7/2003 | Terui et al. | 345/63 |
| 2003/0186040 A1 | 10/2003 | Oya | |

(Continued)

FOREIGN PATENT DOCUMENTS

EP 0782164 7/1997

(Continued)

*Primary Examiner*—Mariceli Santiago
*Assistant Examiner*—Anne M Hines
(74) *Attorney, Agent, or Firm*—Brenc Law

(57) ABSTRACT

The present invention is in the field of plasma display panel filters, and more specifically the present invention is in the field of multiple layer plasma display panel filters having a PVB layer. Also included are methods of filtering plasma display panel radiation and plasma display panel devices utilizing plasma display panel filters of the present invention.

18 Claims, 6 Drawing Sheets

U.S. PATENT DOCUMENTS

2003/0234995 A1    12/2003    Masuda et al.
2005/0106372 A1*   5/2005    Moran et al. ............... 428/215

FOREIGN PATENT DOCUMENTS

| EP | 949648 | 10/1999 |
|---|---|---|
| EP | 1 189 078 | 3/2002 |
| EP | 1197528 | 4/2002 |
| EP | 1251 369 | 10/2002 |
| EP | 1253445 | 10/2002 |
| EP | 1275985 | 1/2003 |
| EP | 1385024 | 1/2004 |
| JP | 2002189420 A | 7/2002 |
| JP | 2002189423 A | 7/2002 |
| WO | WO 2004/016053 A2 | 2/2004 |

* cited by examiner

PLASMA DISPLAY PANEL FILTERS

CROSS-REFERENCE TO RELATED APPLICATIONS

This application claims priority to and is a continuation of U.S. application Ser. No. 10/446,148 filed on May 28, 2003 now abandoned, which is hereby incorporated by reference in its entirety.

FIELD OF THE INVENTION

The present invention is in the field of plasma display filters, and more specifically the present invention is in the field of multiple layer plasma display filters.

BACKGROUND

Plasma displays panels (PDPs) for televisions and other applications create an image by discharging gas plasma that generates light having desirable characteristics. Relative to conventional cathode ray tubes, PDPs can have superior display capacity, luminance, and contrast. In PDPs, application of a voltage between electrodes creates a discharge of gas plasma, resulting in the emission of ultraviolet (UV) light. The UV emission excites adjacent phosphor materials, resulting in electromagnetic emission of visible light.

PDPs emit plasma having different emission spectra that need to be modified prior to viewing. Optical filters have been used for this purpose. Optical filters can include, for example, a transparent substrate, an antireflective layer on the front surface of the transparent substrate for preventing ambient light reflections, and an electromagnetic wave shield on the rear surface of the transparent substrate.

Conventionally, the antireflective layer can be formed from, for example, silicon oxide or titanium dioxide, and the electromagnetic wave shield can be formed from, for example, copper (Cu) or silver (Ag). Other configurations are known in the art.

Another conventional configuration of a PDP filter employs a coated polyethylene terephthalate (PET) film glued to a glass surface. These conventional arrangements, however, can result in less than ideal appearance, stability, and light reflectance/transmittance characteristics.

What are needed in the art are PDP filters having, relative to conventional PDP filters, enhanced optical quality in combination with easier processing, better impact performance, more stable near infrared (NIR) absorbance/reflectance characteristics, a neutral color, strong electromagnetic (EM) shielding, and a lower total weight.

SUMMARY OF THE INVENTION

The present invention is in the field of plasma display panel filters, and more specifically the present invention is in the field of multiple layer plasma display panel filters comprising a multiple layer construction comprising a PVB or an ethylene vinyl acetate (EVA) layer. Also included are plasma display panel devices utilizing plasma display panel filters of the present invention and methods of filtering plasma display panel radiation.

The present invention includes a layered plasma display panel filter, comprising: a first layer comprising polyvinyl butyral or ethylene vinyl acetate; a second disposed in contact with said first layer, wherein said second layer comprises a polymeric material; a third layer disposed in contact with said first layer, wherein said third layer comprises glass.

The present invention includes a layered plasma display panel filter, comprising a first layer and a second layer disposed in contact with one another, wherein said first layer comprises polyvinyl butyral or ethylene vinyl acetate.

The present invention includes a method of filtering the electromagnetic radiation produced by a plasma display panel, comprising passing said radiation through a plasma display panel filter comprising a first layer and a second layer disposed in contact with one another, wherein said first layer comprises polyvinyl butyral or ethylene vinyl acetate.

DETAILED DESCRIPTION

The present invention relates to PDP filters for use with plasma displays. The present invention includes multiple layer PDP filters where at least one layer comprises polyvinyl butyral (PVB) or ethylene vinyl acetate (EVA). These layers can include a near infrared (NIR) absorber or other agents. Other embodiments of the present invention can include various additional layers, including further PVB or EVA layers, polymer layers (such as PET or PEN (polyethylene napthalate) layers) supporting an antireflective layer (such as a coated titanium dioxide or silicon oxide layer), an electromagnetic shielding layer (such as a copper grid or silver), and layers comprising other materials as are known in the art.

The present invention specifically includes layered PDP filters comprising a layer comprising PVB or EVA disposed in contact with at least one other layer. In further embodiments, multiple layers, for example 2, 3, or 4, layers of PVB or EVA or both can be included in a PDP filter. As will be apparent to one of ordinary skill in the art from the description and examples below, the inclusion of one or more layers of PVB into a layered PDP filter can provide a filter that has a more appealing appearance, has better stability over time, has better flexibility, can be manufactured to a thinner overall thickness without unacceptable degradation of mechanical properties, and has better transmission, reflectance, and absorbance characteristics relative to filters lacking a PVB layer.

Figure 4:
FIG. 4 represents a schematic cross section of one embodiment of a PDP filter of the present invention.

In one embodiment, the present invention allows for the manufacture and use of a simple, effective multiple layer PDP filter having three layers: a PVB or EVA layer; a layer of polymer such as PET or PEN; and a layer of glass. This particular embodiment is shown in FIG. 4 and is described in detail below.

PVB and EVA layers used in filters of the present invention can comprise any conventional PVB that is suitable for the application. Specifically contemplated are PVB formulations disclosed in U.S. Pat. No. Re. 20,430; U.S. Pat. Nos. 2,496,480; 3,271,235; 5,853,828; 6,093,471; and, 6,559,212.

In one embodiment of the present invention, PVB resin used to form any one or more PVB layers comprises 2 to 50 weight percent, 5 to 40, 8 to 35, or 10 to 30 weight percent hydroxyl groups expressed as polyvinyl alcohol, and 0 to 5 weight percent, 0 to 4, 0 to 3, or 0 to 2.5 weight percent acetate expressed as polyvinyl acetate, with the balance being butyral expressed as polyvinyl butyral. PVB sheets are commercially available from Solutia Inc., (Springfield, Mass.) as Saflex® and E. I. Dupont de Nemours and Company (Wilmington, Del.) as Butacite®.

Plasticized PVB sheet at a thickness of about 0.13 mm to 1.3 mm, for example, can be formed by extruding the mixed formulation through a sheet die, for example by forcing molten, plasticized PVB through a horizontally long vertically narrow die opening substantially conforming in size to the sheet being formed, or by casting molten polymer issuing from an extrusion die onto a die roll in close proximity to the die exit to impart the desired surface characteristics to one side of the polymer. For example, the roll surface can have minute peaks and valleys, thereby causing the side of the sheet contacting the roll to have a rough surface generally conforming to the valleys and peaks on the roll surface. Roughness on the other side can be provided by the design of the extrudate die opening. Other known techniques for producing a rough surface on one or both sides of an extruding sheet involve specifying and controlling polymer molecular weight distribution, water content, and/or temperature of the melt. These techniques are disclosed in U.S. Pat. Nos. 2,904,844; 2,909,810; 3,994,654; 4,575,540 and European Patent No. EP0185863. Embossing downstream of the extrusion die also can be used to roughen the sheet surface. As is known, this roughness is temporary and is imparted to facilitate deairing during laminating after which elevated temperature and pressure during bonding of the sheet to glass melts can melt the sheet to a smooth finish. The finished sheet can be laminated to glass or other layers according to generally known procedures.

In various embodiments of the present invention a PVB layer can contain 10 to 90, 20 to 80, 20 to 60, or 25 to 45 parts of plasticizer per 100 parts of PVB resin. Examples of plasticizers are disclosed in U.S. Pat. No. 4,654,179. In one embodiment, dihexyl adipate and/or triethylene glycol di-2 ethylhexanoate are used.

Layers of PVB and EVA of the present invention can additionally comprise additives to improve performance such as dyes, pigment colorants, UV stabilizers, antioxidants, glass adhesion control agents, and the like.

The PVB and EVA layers of the present invention can comprise an optical filter agent absorbing at 590 nm, which preferably is compatible with the PVB or the EVA. In various embodiments, the agent absorbing at 590 nm selectively absorbs at 590 nm, which means the agent absorbs light in a very narrow band around 590 nm. This optical filter serves as an absorber of the light specifically emitted by the excited neon gas, which typically is part of the gas of the plasma display unit. This wavelength preferably is absorbed in order to obtain an improved color balance. Examples of potential optical filter agents include, but are not limited to, cyanine-based dye, azulenium-based dye, squalium-based dye, diphenylmethane-based dye, triphenylmethane-based dye, oxazine-based dye, azine-based dye, thiopyrylium-based dye, viologen-based dye, azo-based dye, metal azo-based complex dye, bisazo-based dye, naphthoquinone-based dye, anthraquinone-based dye, perylene-based dye, indanthrone-based dye, phthalocyanine-based dye, nitroso-based dye, metal dithiol-based dye, indoaniline-based dye, quinoline-based dye. Examples of useful dyes include Gentex Filtron A178 (Gentex Corp., Carbondale, Pa.), Gentex Filtron A193, Pyrromethene 650 (Lambda Physik, Gottingen, Germany), and DQOCI (Lambda Physik), among others.

In addition, the PVB or EVA of the present invention can comprise one or more NIR absorbers. The main purpose of an NIR absorber is to absorb radiation in the wavelength range of 800 nm to 1200 nm, which facilitates the use of remote control devices operating within this frequency range. Examples of useful NIR absorber agents include, but are not limited to, cyanine-based dye, azulenium-based dye, squarylium-based dye, diphenylmethane-based dye, triphenylmethane-based dye, oxazine-based dye, azine-based dye, thiopyrylium-based dye, viologen-based dye, azo-based dye, metal azo-based complex dye, bisazo-based dye, naphthoquinone-based dye, anthraquinone-based dye, perylene-based dye, indanthrone-based dye, phthalocyanine-based dye, nitroso-based dye, metal dithiol-based dye, indoaniline-based dye, quinoline-based dye. Examples of useful dyes include Gentex Filtron A101, Gentex Filtron A195, Keystone TB225 (Keystone Aniline Corp., Chicago Ill.), Keysorb 975 nm, TN228 Keysorb 993 nm, IR5, IR26, IR132 from Lambda Physik, or quaterrylenetetracarboxylic diimides such as those disclosed in published U.S. patent application 20020182422.

NIR absorption can also be accomplished using nanoparticle technology and may include the inclusion of ATO (antimony tin oxide), ITO (indium tin oxide, U.S. Pat. No. 5,830,568), or $LaB_6$ (lanthanum hexaboride, U.S. patent application 200200086926), semiconductor nanoparticles, among others.

In a preferred embodiment, one or more PVB or EVA layers of a filter of the present invention comprise an NIR absorber, and in specific embodiments the NIR absorber is selected from the group consisting of $LaB_6$, Gentex Filtron A101, Gentex Filtron A195, Gentex Filtron A208, and quaterrylenetetracarboxylic diimides.

Because NIR absorbers can introduce a yellow-greenish color aspect to the PVB or EVA layer, a color correction preferably can be achieved by adding colorants to the PVB or EVA layer. Such colorants can include pigments or dyes absorbing in a particular wavelength region that are specifically chosen to change the color of the spectrum as is known in the art.

In various embodiments of the present invention, one or more colorants may be admixed with the PVB or EVA or printed on the surface of the PVB or EVA sheet, such as disclosed in U.S. Pat. Nos. 3,922,456 and 3,982,984. In one embodiment copper phthalocyanine pigment blue can be used as a colorant (Sigma-Aldrich Corp., St. Louis, Mo.). In another embodiment, C.I. solvent blue 102, which is available as "KEYSTONE BLUE RC" (Keystone Aniline Corp., Chicago Ill.), can be used as a colorant.

Using the CIELAB system, a well-known international standard for color measurement, the color of an object under fixed viewing conditions can be defined. A set of dimensionless coordinates $L^*$, $a^*$, $b^*$ are used to define a color's hue and intensity. These coordinates are measured according to instructions provided in the publication "Standard Practice for Computing the Colors of Objects by Using the CIE System," ASTM E 308-01. The wavelength range is between 400 nm and 700 nm, at a wavelength interval of 20 nm. The coordinate L* is used to measure the lightness or darkness of a color. White is denoted by L*=100 and black is denoted by L*=0. The coordinate a* measures the level of green or red color in the object, and the coordinate b* measures the level of blue or yellow in the object.

Alternatively, NIR absorbers can be partially or completely eliminated from the PVB or EVA and replaced by coated glass, a coated polymer structure (typically PET), or with a multilayer film, such as the those available from 3M and described in U.S. Pat. No. 6,498,683, among others.

It is also possible to combine NIR absorbers with coated glass, coated polymer, or multilayer films in order to achieve the desired result. For example, a combination of NIR absorbers in PVB with IR reflecting films is reported in U.S. application 20030054160, which also reports NIR absorbers coated on PET and combined with PVB. These combinations can be used with embodiments of the present invention, as appropriate.

In any of the embodiments of the present invention in which an agent is added to the PVB or EVA layer to impart desired characteristics, it is generally possible and will be appreciated by those with skill in the art that some or all of the added agents can be applied to the PET or PEN polymer layer or glass layer instead of or in addition to the agent's inclusion in the PVB layer. For example, a PET layer can be coated with $LaB_6$ and then laminated to a layer of PVB having no pigment or a reduced level of pigment. Some of the agents contemplated herein can also be directly applied to a glass layer that is then laminated to a layer of PVB. Any of the agents of the present invention referred to herein can be used in this manner, where appropriate.

As used herein, "glass" means any form of glass as is commonly known in the art, but not limited to glass consisting essentially of silicon dioxide. In various embodiments of the present invention the glass comprises silicon dioxide or is essentially all silicon dioxide.

A particular benefit of the present invention is improved overall electromagnetic radiation transmission, absorbance, and reflectance characteristics. PDP filters of the present invention as described elsewhere herein employing at least one PVB layer include filters that preferably have the following qualities when the PVB layer is laminated between two layers of glass each having a thickness of 2 millimeters: transmission in the visual range of 20 to 60 percent, 30 to 50 percent, or 35 to 45 percent, transmission at 590 nanometers of 0 to 65 percent, 5 to 50 percent, 10 to 40 percent, or 20 to 30 percent; transmission at 800 nanometers of less than 30 percent, 25 percent, or 20 percent, transmission at 850 nanometers of less than 25 percent, less than 20 percent, or less than 15 percent, transmission in the 900 to 1100 nanometer range of less than 15 percent, less than 12 percent, less than 10 percent, or less than 6 percent; transmission in the 1100 to 1200 nanometers of less than 15 percent or less than 10 percent. Any of the above given ranges can be combined with each other in any combination in any of the various embodiments of the present invention to achieve the desired result.

In a further embodiment, two or more layers of PVB or EVA are used to achieve, cumulatively, the same optical qualities given above. In one embodiment, a multiple layer PDP filter of the present invention comprises two layers of PVB or EVA, each of which has had agents added to it to yield a net optical transmission effect as given above for a single layer. For this embodiment, two layers of PVB or EVA or one of each can be layered with 2.0 mm glass in order to establish the optical properties. In one embodiment of the present invention, a filter comprises two layers of PVB or EVA or one of each, and the two layers of PVB or EVA or both have the following properties when those layers are disposed in the order 2.0 mm glass//PVB or EVA layer//2.0 mm glass//PVB or EVA layer//2.0 mm glass (i.e. when laminated with three layers of 2.0 mm glass): transmission in the visual range of 20 to 60 percent, 30 to 50 percent, or 35 to 45 percent, transmission at 590 nanometers of 0 to 65 percent, 5 to 50 percent, 10 to 40 percent, or 20 to 30 percent; transmission at 800 nanometers of less than 30 percent, 25 percent, or 20 percent, transmission at 850 nanometers of less than 25 percent, less than 20 percent, or less than 15 percent, transmission in the 900 to 1100 nanometer range of less than 15 percent, less than 12 percent, less than 10 percent, or less than 6 percent; transmission in the 1100 to 1200 nanometers of less than 15 percent or less than 10 percent. Any of the above given ranges can be combined with each other in any combination in any of the various embodiments of the present invention to achieve the desired result.

In the foregoing embodiment and in any other embodiments of the present invention comprising two layers of PVB or EVA or both, the two layers of PVB or EVA or both can be disposed in contact with one another and then disposed between any of the other layers given herein, for example between a layer of PET and a layer of glass. This arrangement can be useful if, for example, it is desired to impart different optical qualities on two layers of PVB or EVA using the agents described herein rather than imparting all of the qualities on a single sheet of PVB or EVA. This alternative embodiment is useful, for example, when two or more agents can not be readily disposed on a single layer of PVB or EVA. By combining two layers of PVB or EVA or both, an embodiment similar to the one shown in FIG. 4 can be produced wherein the single middle PVB or EVA layer is replaced with two layers of PVB or EVA or both, leading to a final arrangement of: polymeric material such as PET// PVB or EVA layer//PVB or EVA layer//glass layer.

For any PVB or EVA layer in a filter of the present invention, preferable a* and b* factor (as based on the L*a*b* calorimetric system) values are −15 and +15, −10 and +10, −5 and +5, and −2 and +2.

In any of the embodiments described below and depicted schematically in cross section in the figures, one or both of the PVB layers shown can be substituted with an EVA layer.

Figure 1:
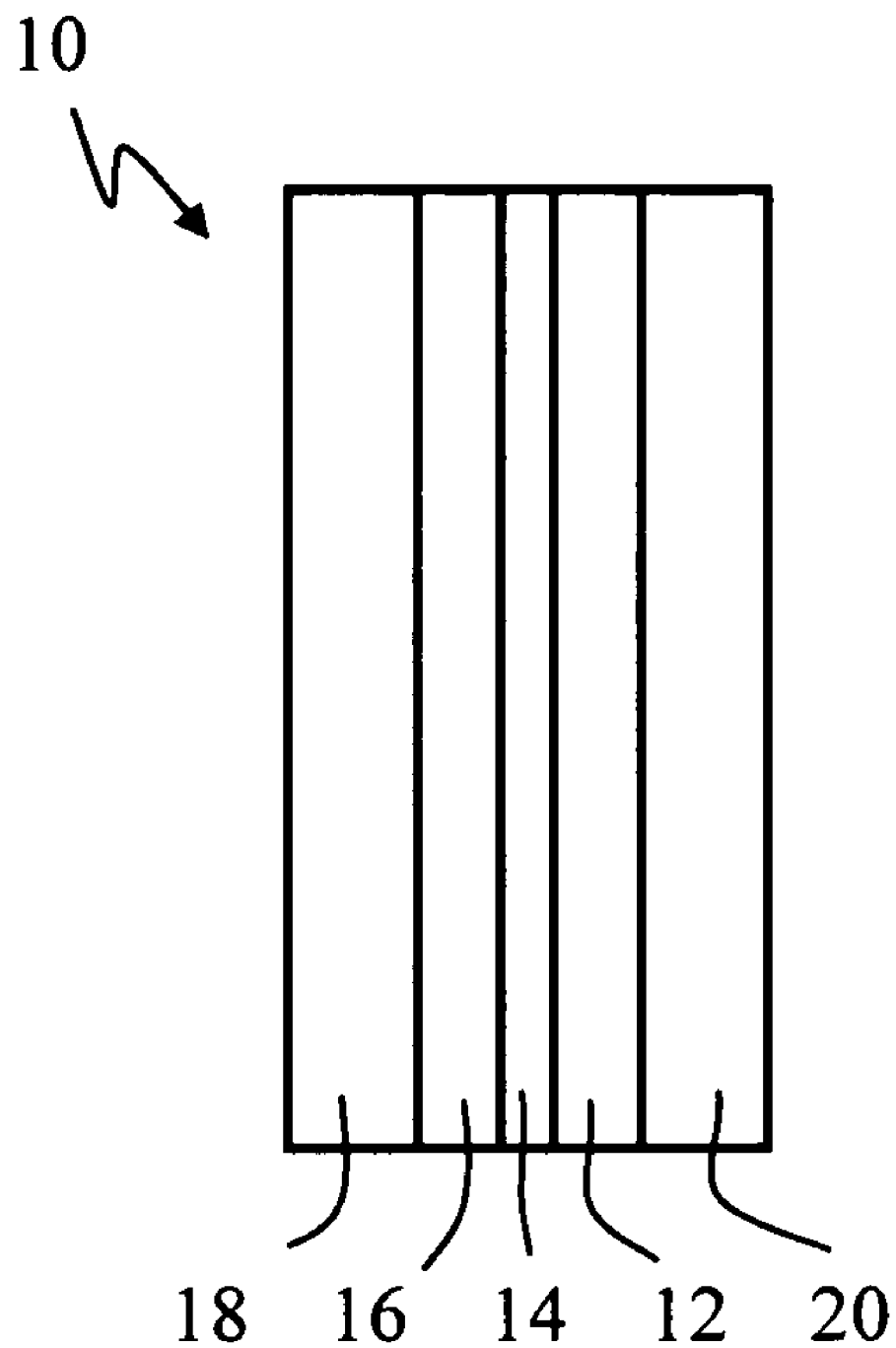
FIG. 1 represents a schematic cross section of one embodiment of a PDP filter of the present invention.

One embodiment of the present invention is shown in schematic cross section generally at 10 in FIG. 1. As shown, a first layer 12 comprising PVB is disposed in contact with a second layer 14. This second layer can comprise a polymer, for example PET or PEN and, optionally, an electrically conductive component, such as a copper grid, or an NIR absorbing or reflective coating. A third layer 16 comprising PVB is disposed in contact with the second layer 14. Either of the PVB layers can comprise any of the additional agents described elsewhere herein. In one embodiment both PVB layers have the same composition and contain both an agent absorbing at 590 nm, an NIR absorbing agent, and a color modifying pigment or dye. In another embodiment, a 590 nm absorbing agent is disposed in only one of the PVB layers, while an NIR absorbing agent is disposed only in the other PVB layer. In any of the embodiments described herein in which a PET layer is used, a PEN layer can alternatively be substituted.

A fourth layer 18 comprising an anti-reflecting glass panel is disposed in contact with the third layer 16 and serves as the viewing surface. Other viewing surfaces, as are known in the art, can readily be substituted for the fourth layer. A fifth layer 20 is disposed in contact with the first layer 12, and this fifth layer comprises a coated glass layer.

The arrangement of layers shown in FIG. 1, it will be seen, is only one possible, exemplary arrangement of layers, and one skilled in the art will recognize that many different configurations are possible using one or more PVB and/or EVA layers.

In the arrangement shown in FIG. 1, preferred layer thicknesses are as follows: first and third layers (for PVB or EVA), less than 1 millimeter, 0.8, 0.6, or 0.4 millimeter thick; second layer, less than 200 microns, 180, 160, 140, 120, or 100 microns thick; fourth layer, less than 3.5 millimeters, 3.0, 2.5, 2.3, or 2.0 millimeters thick; and fifth layer, less than 2.5 millimeters, 2.0, 1.7, or 1.5 millimeters thick. Other embodiments of the present invention utilize layers having thicknesses different than those given above, in accordance with the particular application. The embodiment shown in FIG. 1 is preferably less than 5.5 millimeters, 5.0, 4.7, 4.5, 4.25, or 4.0 millimeters in total thickness.

Figure 2:
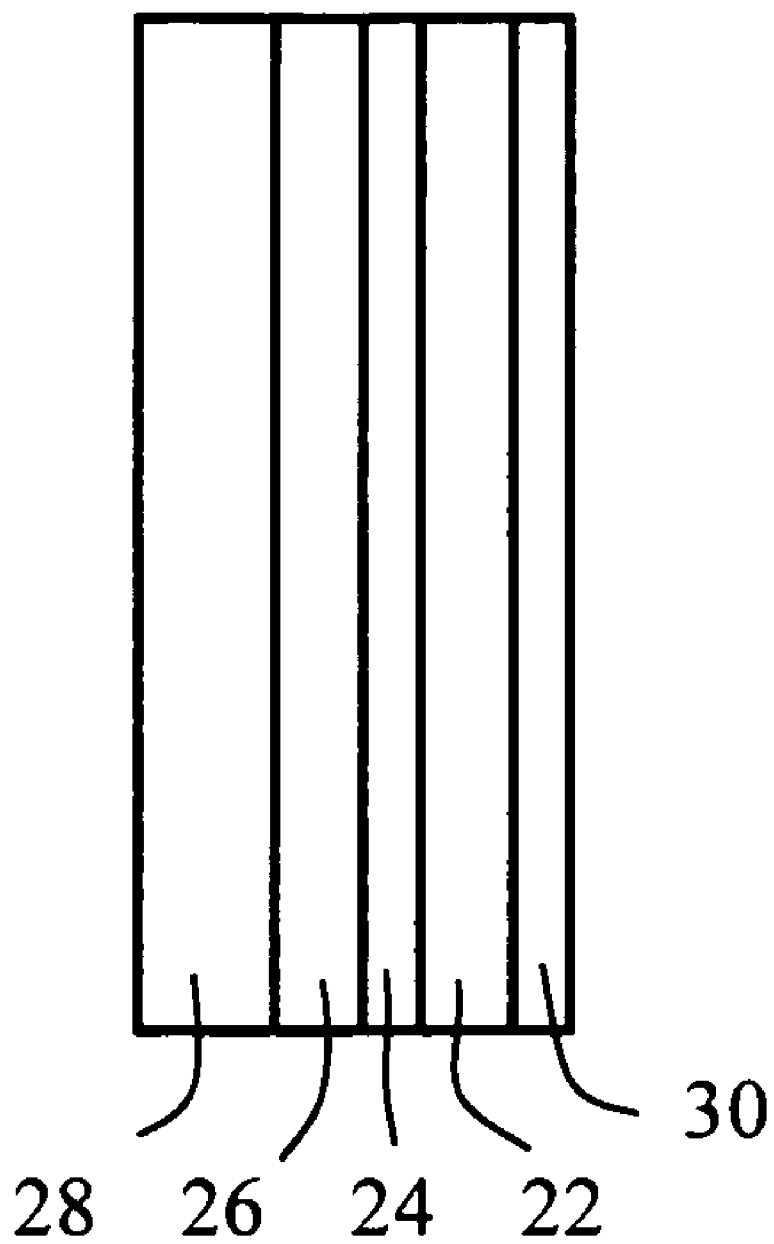
FIG. 2 represents a schematic cross section of one embodiment of a PDP filter of the present invention.

Another embodiment of the present invention is shown in schematic cross section in FIG. 2. The various layers of the embodiment shown in FIG. 2 can comprise various components as described elsewhere herein. As shown in FIG. 2, a first layer 22 comprising PVB is disposed in contact with a second layer 24. The second layer 24 can comprise PET, for example a PET film product produced by 3M (St. Paul, Minn.) or CPFilms (Martinsville, Va.). In this embodiment, this layer of PET can optionally comprise a copper grid or equivalent material. A third layer 26 disposed in contact with the second layer 24 comprises PVB having an agent that absorbs radiation in the 590 nanometer range, as described above. A fourth layer 30 disposed in contact with the first layer 22 comprises PET or equivalent material and optionally has a copper grid or equivalent material. In this embodiment the fourth layer 30 faces the PDP. An anti-scratch layer (not shown), comprising silicon dioxide, for example, may optionally be disposed in contact with the fourth layer 30. A fifth layer 28 is disposed in contact with the third layer 26 and comprises glass with an anti-reflective coating. This embodiment provides the advantage of a thinner overall filter that retains the desired properties. The first and third layers 22, 26 of this embodiment are preferably less than 1 millimeter, 0.8, 0.6 or 0.4 millimeters thick. Other layers and the sum of all the layers can have, for example, the thicknesses described above for the embodiment shown in FIG. 1.

Figure 3:
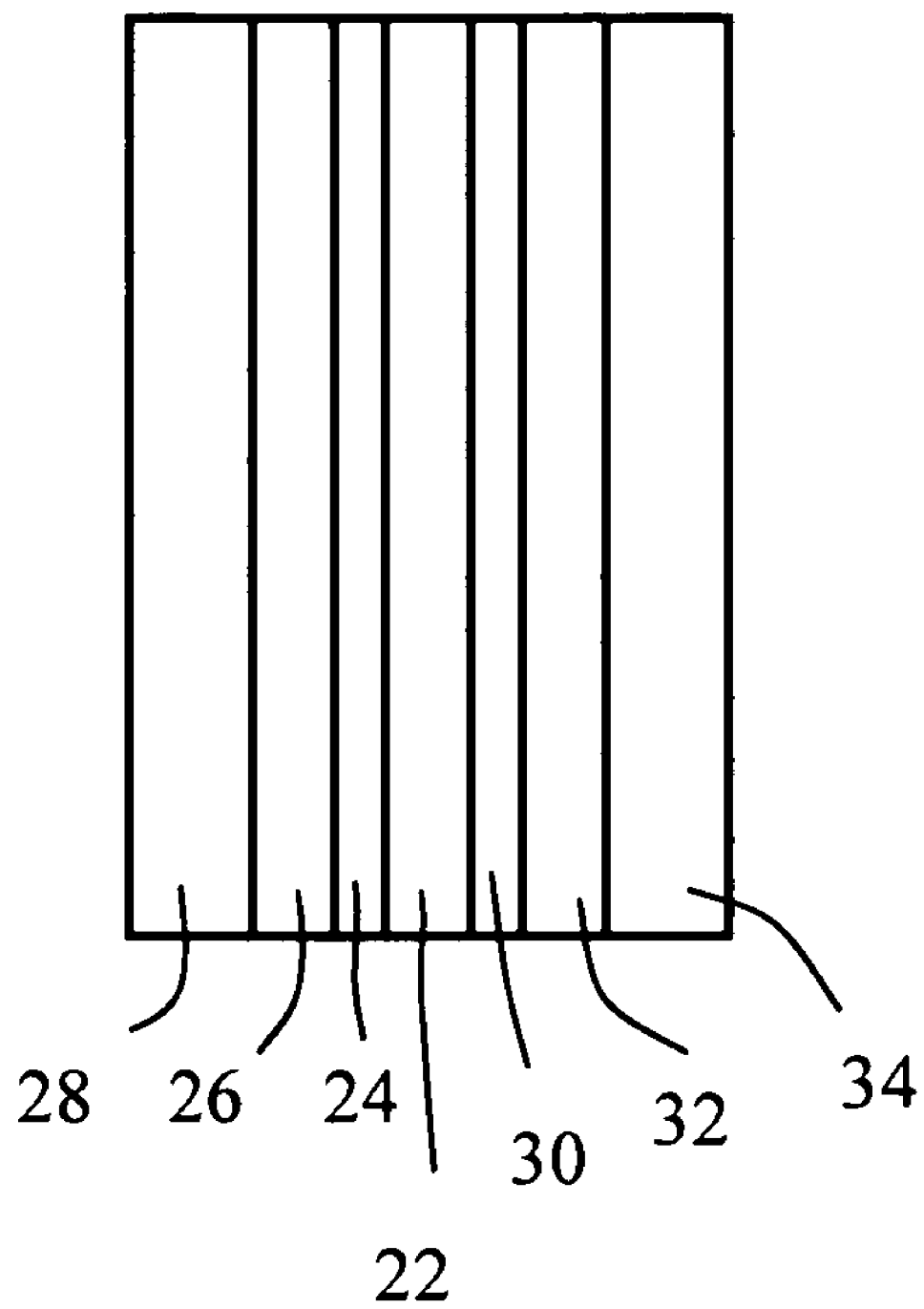
FIG. 3 represents a schematic cross section of one embodiment of a PDP filter of the present invention.

FIG. 3 represents a schematic cross section of another embodiment of a PDP filter of the present invention. This embodiment adds two layers to the embodiment shown in FIG. 2. In this embodiment, a sixth layer 32 is disposed in contact with the fourth layer 30. The sixth layer comprises a PVB layer. In one embodiment, this sixth layer does not have added agents and is clear PVB. A seventh layer 34 is disposed in contact with the sixth layer 32 and can comprise, for example, a protective layer such as a glass layer. Thicknesses for the various layers are as above for the embodiment shown in FIG. 2, except for in this embodiment the first, third, and sixth layers 22, 26, 32 are preferably less than 1.0 millimeter, 0.7, 0.5, 0.4, 0.3, or 0.2 millimeters thick. Other layers and the sum of all the layers can have, for example, the thicknesses described above for the embodiment shown in FIG. 1.

Another embodiment of the present invention is shown in schematic cross section in FIG. 4 and has the advantage of having a relatively thin configuration. In this configuration a first layer 36 is disposed in contact with a second layer 38. The first layer 36 comprises PVB comprising one or more of the following three agents: an agent absorbing at 590 nm, an NIR absorbing agent, and an agent for adjusting color. The thickness of the first layer 36 can be less than 1 mm, 0.8 mm, 0.6 mm, or 0.4 mm. The second layer 38 comprises PET containing an electrically conductive coating or a copper grid. This second layer 38 faces the PDP. A third layer 40 is disposed in contact with the first layer 36 and consists of an anti-reflective glass. In this embodiment, the total thickness of the filter, that is, all three layers, is preferably less than 4 mm, 3.5, 3, 2.5, or 2 mm. As shown in this embodiment, one PDP filter of the present invention has no more than three distinct layers laminated together to form a filter.

As used herein, a "layer" can be formed by any method known in the art and can include any distinct portion of the total thickness of the filter that is disposed between and physically separates two other layers. For example, layers can be distinct compositions laminated together to form a multi-layer filter. Layers can also be formed by direct deposition of the material that forms the layer onto an existing layer, among other techniques. In a preferred embodiment, PDP filters of the present invention comprise layers formed by laminating glass, plastic films, and/or other preformed components into a single finished filter. Any methods conventionally used in the art for laminating or depositing layers can be used.

The present invention also includes methods for filtering the electromagnetic radiation produced by a plasma display panel, comprising passing said radiation through any of the PDP filters within the scope of this invention, for example a plasma display panel filter comprising a first layer and a second layer disposed in contact with one another, wherein said first layer comprises polyvinyl butyral.

The present invention further includes devices that use PDPs in which a PDP filter within the scope of the present invention is used. Examples include, but are not limited to monitors or televisions.

The use of multiple layer PDP filters of the present invention can impart improved stiffness to a filter relative to conventional arrangements, thereby reducing the overall thickness and/or weight of the filter while retaining impact performance.

The following examples illustrate various embodiments of the present invention.

EXAMPLE 1

Figure 5:
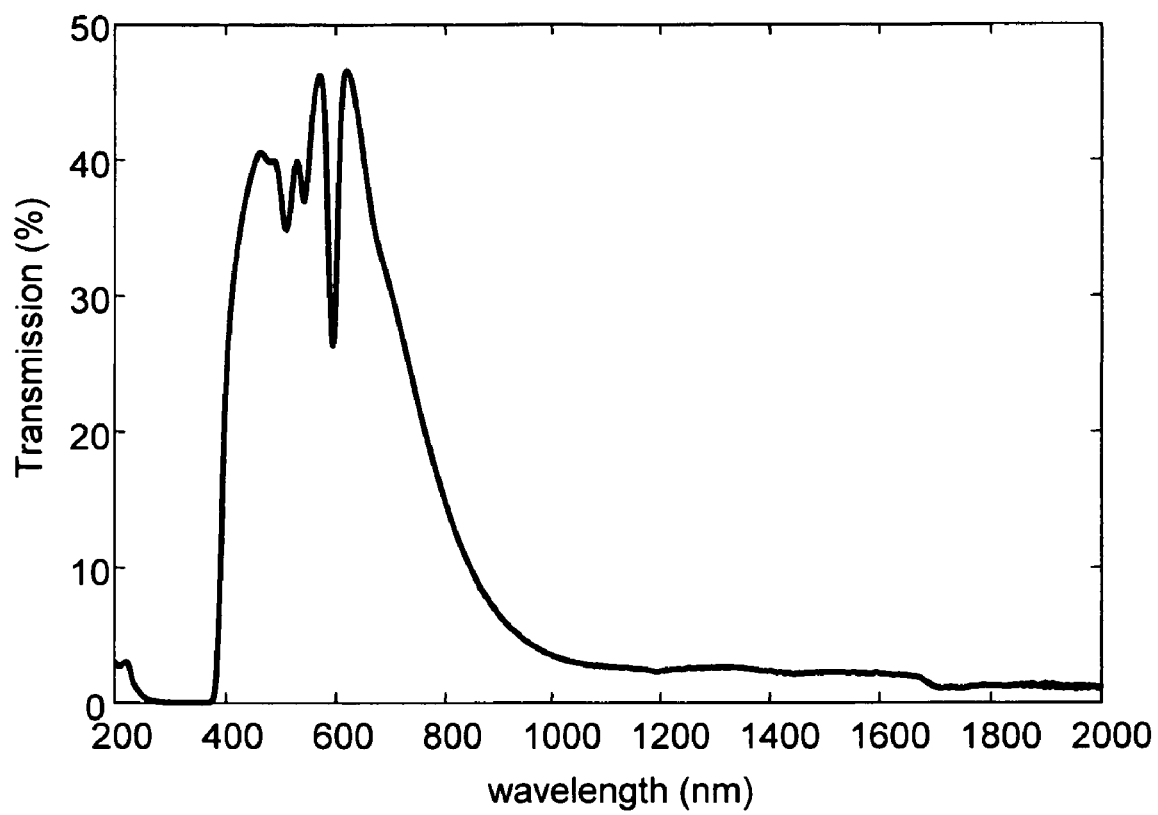
FIG. 5 represents a graph illustrating the transmission of electromagnetic radiation through one embodiment of a plasma display panel filter of the present invention.

FIG. 5 shows a graph of percent transmission of electromagnetic radiation having wavelengths ranging from 200 to 2000 nanometers through one embodiment of the present invention. In this example, the filter has the following configuration: anti-reflective glass//PVB//PET with EM shielding (cu-grid)//PVB//coated glass. The PVB contains 0.0095% of C.I. pigment red (Clariant, Germany), 0.011% of $LaB_6$ and 0.0031% of Gentex Filtron A178. Also a UV stabilizer is added to the PVB.

As shown in FIG. 5, transmission around the 590 nanometer range is limited to less than 50 percent transmission, while transmission over 900 nanometers and less than about 380 nanometers is less than about 5 percent. The color obtained in this particular system can be described by the calometric $L^*a^*b^*$-system with values for $a^*=-0.7$ and for $b^*=0.2$.

Figure 6:
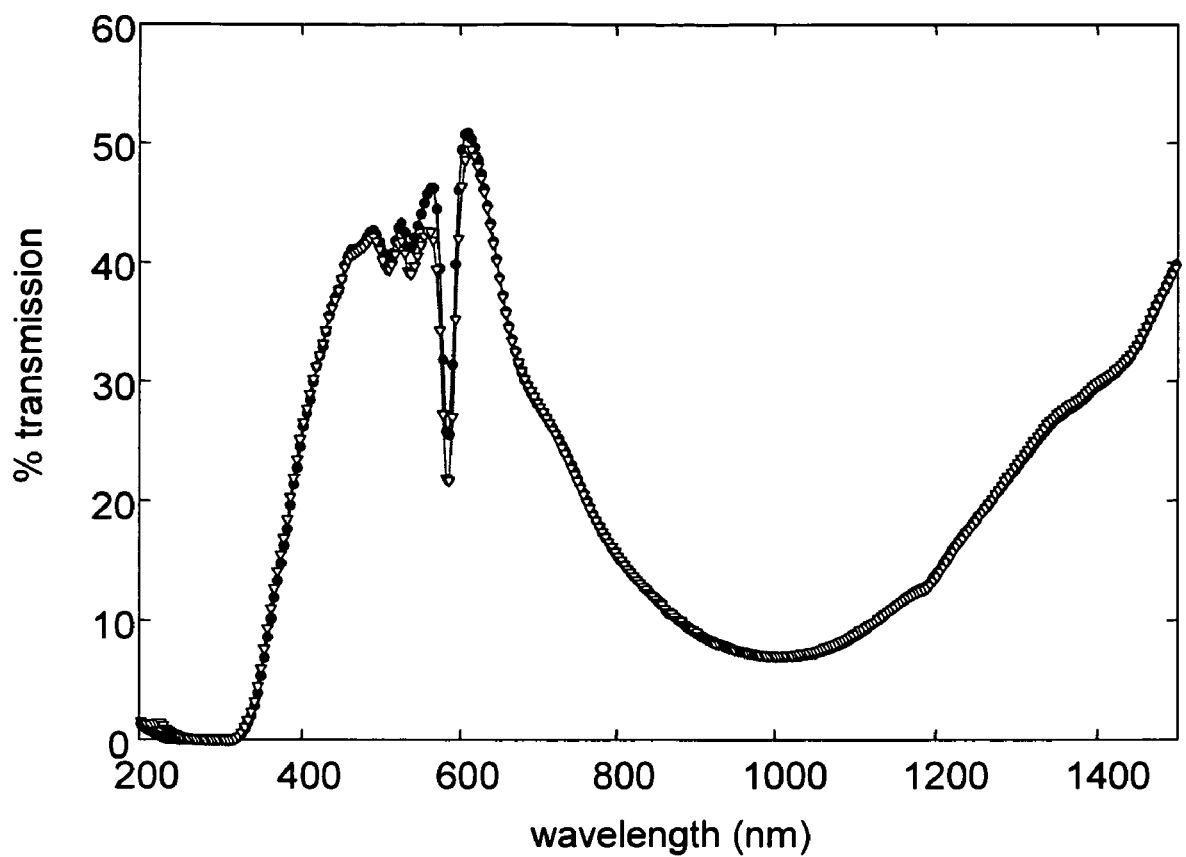
FIG. 6 represents a graph illustrating the transmission of electromagnetic radiation through one embodiment of a plasma display panel filter of the present invention.

FIG. 6 shows a graph of percent transmission of wavelengths ranging from 200 to 2000 nanometers through one embodiment of a PDP filter of the present invention. In this example, the filter has the following configuration:

Anti-reflective glass//PVB//PET with EM shielding//PVB// clear glass. NIR absorption is achieved by the PVB interlayer. The PVB comprises 0.0063% of C.I. pigment red, 0.0245% of $LaB_6$, and 0.0023% of Gentex Filtron A193 and has a thickness of 0.76 mm. The color as measured using the calometric $L*a*b*$-system can be described by $a*=-1.3$ and $b*=5.2$. The $b*$ can be adjusted towards 0, with a minimum effect on total visual transmission using a dye absorbing specifically in the 560-580 nm range.

In FIG. 6, the solid circles represent the formulation and the triangles represent the formulation with color adjustment. As shown in FIG. 6, transmission around the 590 nanometer range is limited to less than 50 percent transmission, while transmission over 900 nanometers gradually increases to 50 percent and transmission at less than about 350 nanometers is close to zero.

One of ordinary skill in the art will be able to see that the configuration of layers used to generate the data shown in FIG. 6 can be altered to have only three layers by simply removing a layer of glass and PVB and applying an equivalent amount of the agents from the removed PVB layer to the PVB layer remaining. This configuration would correspond to the embodiment shown in FIG. 4.

Any figure reference numbers given within the abstract or any claims are for illustrative purposes only and should not be construed to limit the claimed invention to any one particular embodiment shown in any figure.

Each patent, application, document, journal article, or other reference cited herein is hereby incorporated herein in its entirety.

We claim:

1. A plasma display panel device, comprising:
   a plasma display panel; and,
   a layered plasma display panel filter, comprising:
   a first layer comprising polyvinyl butyral or ethylene vinyl acetate;
   a second layer disposed in contact with said first layer, wherein said second layer comprises polyethylene terephthalate,
   a third layer disposed in contact with said first layer, opposite said second layer, wherein said third layer comprises glass;
   a fourth layer disposed in contact with said second layer, opposite said first layer, wherein said fourth layer comprises polyvinyl butyral or ethylene vinyl acetate; and,
   a fifth layer disposed in contact with said fourth layer, opposite said second layer, wherein said fifth layer comprises polyethylene terephthalate, wherein said layered plasma display panel filter has the following cumulative optical properties:
   global visible transmission expressed as illuminant C of 30% to 70%;
   transmission at 590 nm of 0% to 65%;
   transmission at 800 nm of less than 25%;
   transmission at 850 nm less than 15%
   transmission between 900 nm and 1100 nm less than 10%; and,
   color expressed by the $L*a*b*$-system for $a*$ and $b*$ of between −5 and +5.

2. The plasma display panel device of claim 1, wherein said first layer comprises polyvinyl butyral.

3. The plasma display panel device of claim 1, wherein said first layer comprises ethylene vinyl acetate.

4. The plasma display panel device of claim 1, wherein said first layer comprises an NIR absorbing agent.

5. The plasma display panel device of claim 1, wherein said first layer comprises an agent that selectively absorbs light having a wavelength of 590 nanometers.

6. The plasma display panel device of claim 1, wherein said second layer comprises an electromagnetic shield.

7. The plasma display panel device of claim 6, wherein said electromagnetic shield is a copper grid.

8. The plasma display panel device of claim 1, wherein said filter has a thickness of less than 4.0 millimeters.

9. The plasma display panel device of claim 1, wherein said filter has a thickness of less than 3.5 millimeters.

10. A plasma display panel device, comprising:
    a plasma display panel; and,
    a layered plasma display panel filter, comprising:
    a first layer comprising polyvinyl butyral or ethylene vinyl acetate;
    a second layer disposed in contact with said first layer, wherein said second layer comprises polyethylene terephthalate,
    a third layer disposed in contact with said first layer, opposite said second layer, wherein said third layer comprises glass;
    a fourth layer disposed in contact with said second layer, opposite said first layer, wherein said fourth layer comprises polyvinyl butyral or ethylene vinyl acetate; and,
    a fifth layer disposed in contact with said fourth layer, opposite said second layer, wherein said fifth layer comprises polyethylene terephthalate, wherein said first layer has the following optical properties:
    global visible transmission expressed as illuminant C of 30% to 70%;
    transmission at 590 nm of 0% to 65%;
    transmission at 800 nm of less than 25%;
    transmission at 850 nm less than 15%
    transmission between 900 nm and 1100 nm less than 10%; and,
    color expressed by the $L*a*b*$-system for $a*$ and $b*$ of between −5 and +5.

11. The plasma display panel device of claim 10, wherein said first layer comprises polyvinyl butyral.

12. The plasma display panel device of claim 10, wherein said first layer comprises ethylene vinyl acetate.

13. The plasma display panel device of claim 10, wherein said first layer comprises an NIR absorbing agent.

14. The plasma display panel device of claim 10, wherein said first layer comprises an agent that selectively absorbs light having a wavelength of 590 nanometers.

15. The plasma display panel device of claim 10, wherein said second layer comprises an electromagnetic shield.

16. The plasma display panel device of claim 15, wherein said electromagnetic shield is a copper grid.

17. The plasma display panel device of claim 10, wherein said filter has a thickness of less than 4.0 millimeters.

18. The plasma display panel device of claim 10, wherein said filter has a thickness of less than 3.5 millimeters.

* * * * *